(12) United States Patent
Eller et al.

(10) Patent No.: US 9,667,547 B2
(45) Date of Patent: May 30, 2017

(54) CONGESTION MANAGEMENT AND LATENCY PREDICTION IN CSMA MEDIA

(71) Applicant: CoCo Communications Corp., Seattle, WA (US)

(72) Inventors: Riley Eller, Seattle, WA (US); Dennis Edwards, Seattle, WA (US); Jeremy Bruestle, Seattle, WA (US); Mark L Tucker, Seattle, WA (US)

(73) Assignee: CoCo Communications Corp., Seattle, WA (US)

( * ) Notice: Subject to any disclaimer, the term of this patent is extended or adjusted under 35 U.S.C. 154(b) by 352 days.

(21) Appl. No.: 14/605,667

(22) Filed: Jan. 26, 2015

(65) Prior Publication Data

US 2015/0142972 A1 May 21, 2015

Related U.S. Application Data

(63) Continuation of application No. 13/908,924, filed on Jun. 3, 2013, now Pat. No. 8,943,219, which is a continuation of application No. 13/532,547, filed on Jun. 25, 2012, now Pat. No. 8,458,330, which is a continuation of application No. 12/278,146, filed as application No. PCT/US2007/061485 on Jun. 26, 2009, now Pat. No. 8,209,433.

(60) Provisional application No. 60/764,013, filed on Feb. 1, 2006.

(51) Int. Cl.
| | |
|---|---|
| *G06F 15/173* | (2006.01) |
| *G06F 15/16* | (2006.01) |
| *H04L 12/801* | (2013.01) |
| *H04L 12/413* | (2006.01) |
| *H04L 12/26* | (2006.01) |
| *H04L 12/24* | (2006.01) |

(52) U.S. Cl.
CPC ............ *H04L 47/11* (2013.01); *H04L 12/413* (2013.01); *H04L 43/0852* (2013.01); *H04L 43/10* (2013.01); *H04L 41/14* (2013.01); *H04L 47/10* (2013.01)

(58) Field of Classification Search
CPC ..... H04L 41/14; H04L 43/10; H04L 43/0852; H04L 47/10; H04L 47/11
USPC .................................................. 709/224, 235
See application file for complete search history.

(56) References Cited

U.S. PATENT DOCUMENTS

| | | | |
|---|---|---|---|
| 6,243,389 B1 * | 6/2001 | Khanna | H04H 20/28 370/408 |
| 7,295,614 B1 | 11/2007 | Shen et al. | |
| 7,453,885 B2 | 11/2008 | Rogers | |
| 7,529,247 B2 | 5/2009 | Rogers | |
| 7,535,839 B2 | 5/2009 | Kadaba et al. | |
| 7,551,559 B1 | 6/2009 | Jonnala et al. | |
| 7,751,370 B2 | 7/2010 | Tiedemann et al. | |
| 7,782,786 B1 | 8/2010 | Natarajan et al. | |

(Continued)

FOREIGN PATENT DOCUMENTS

JP      2001142747      5/2001

*Primary Examiner* — Kristie Shingles
(74) *Attorney, Agent, or Firm* — Lowe Graham Jones PLLC

(57) ABSTRACT

A facility for congestion management and latency prediction is described. In various embodiments, the facility sums a series of fractional transmission delays wherein each fractional transmission delay is measured as a probability of a failed transmission attempt multiplied by the cost of the failed transmission attempt, and provides the sum.

15 Claims, 1 Drawing Sheet

(56) References Cited

U.S. PATENT DOCUMENTS

| | | |
|---|---|---|
| 8,005,030 B2 | 8/2011 | Stephenson et al. |
| 8,040,811 B2 | 10/2011 | Edwards et al. |
| 8,068,437 B2 | 11/2011 | Hardy |
| 9,148,908 B2 * | 9/2015 | Bhargava ............ H04W 72/085 |
| 2002/0131386 A1 | 9/2002 | Gwon |
| 2003/0043925 A1 | 3/2003 | Stopler et al. |
| 2006/0171523 A1 | 8/2006 | Greenwell |
| 2008/0052394 A1 | 2/2008 | Bugenhagen et al. |
| 2008/0270124 A1 | 10/2008 | Son et al. |

\* cited by examiner

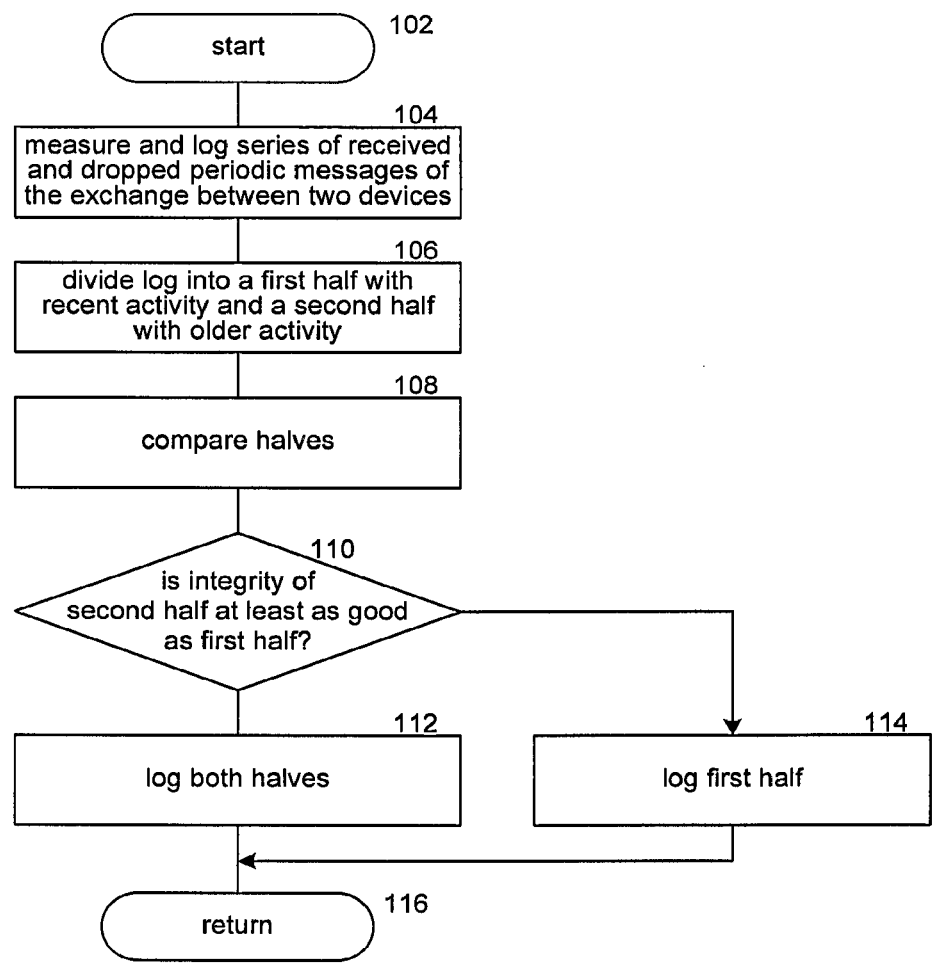

CONGESTION MANAGEMENT AND LATENCY PREDICTION IN CSMA MEDIA

PRIORITY CLAIM

This application is a Continuation of U.S. Utility Application entitled "CONGESTION MANAGEMENT AND LATENCY PREDICTION IN CSMA MEDIA," having application Ser. No. 13/908,924, filed Jun. 3, 2013, and which issues to U.S. Pat. No. 8,943,219 on Jan. 27, 2015; which is a Continuation of U.S. Utility Application entitled "CONGESTION MANAGEMENT AND LATENCY PREDICTION IN CSMA MEDIA," having application Ser. No. 13/532,547, filed Jun. 25, 2012, and which issued to U.S. Pat. No. 8,458,330 on Jun. 4, 2013; which is a Continuation of U.S. Utility Application entitled "CONGESTION MANAGEMENT AND LATENCY PREDICTION IN CSMA MEDIA," having application Ser. No. 12/278,146, filed Aug. 1, 2008, and completed on Jun. 26, 2009, which issued to U.S. Pat. No. 8,209,433 on Jun. 26, 2012; which is a U.S. National Stage application of International Application No. PCT/US07/61485, entitled "CONGESTION MANAGEMENT AND LATENCY PREDICTION IN CSMA MEDIA," filed Feb. 1, 2007; which claims the benefit of U.S. Provisional Patent Application Ser. No. 60/764,013, entitled "CONGESTION MANAGEMENT AND LATENCY PREDICTION IN CSMA MEDIA," filed Feb. 1, 2006, and is related to U.S. Provisional Patent Application Ser. No. 60/763,977 entitled "PROTOCOL CIRCUIT LAYER," filed Feb. 1, 2006, and U.S. Provisional Patent Application Ser. No. 60/763,959 entitled "PROTOCOL LINK LAYER," filed Feb. 1, 2006. Accordingly, the present application claims priority to and the benefit of the filing dates of U.S. application Ser. No. 12/278,146, International Application No. PCT/US07/61485 and Provisional Application No. 60/764,013. Further, the present application incorporates by reference U.S. application Ser. No. 13/532,547, U.S. application Ser. No. 12/278,146, International Application No. PCT/US07/61485, Provisional Application No. 60/764,013, Provisional Application No. 60/763,977, and Provisional Application No. 60/763,959, herein in their entireties.

BACKGROUND

Computers have been networked to exchange data between them for decades. One important network, the Internet, comprises a vast number of computers and computer networks interconnected through communication channels. The Internet is used for various reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over hand-held, wireless devices, such as cell phones and portable computers (e.g. PDA's). All of these protocols provide easier ways to provide information to people via various data processing devices. Many other protocols and means for exchanging data between data processing device continue to develop to further aid the exchange of information.

In wireless communications, it is common to remedy the problem of media collision by using acknowledged receipt with finite retransmission strategy for point-to-point messages. In order to allow for communication networks of varying density and to ameliorate congestion, it is also common to use delays with an exponentially-increasing coefficient. Broadcast messages, however, may not be able to effectively use acknowledged receipt because the number of recipients is unreliable.

One undesirable characteristic of this strategy is that the most congested and least reliable communication links tend to experience the highest message delivery latency. That latency tends also to increase the probability that another message will be waiting on queue before the completion of the previous message delivery. The combination of these factors tends to worsen the initial congestion, making it decreasingly likely that the network will recover on its own. In order to avoid this set of problems, it may be necessary to make routing decisions farther away from the congestion point. That in turn may require a method for the nodes in the congested region to report their propensity for message delay.

Naïve methods for measuring message delay collect only one timing datum per message, and then require a significant number of messages to create a reasonable approximation of the current retransmission delay. These estimates tend to be skewed with respect to time, and that skew tends to be unresponsive to the same bursts of activity that cause the initial congestion to become unmanageable.

BRIEF DESCRIPTION OF THE DRAWINGS

FIG. 1 is a flow diagram illustrating a technique for congestion management and latency prediction in CSMA media.

DETAILED DESCRIPTION

Estimating Peer Broadcast Reliability

The basic unit of measure in this method is the broadcast message. Each participating node transmits a short broadcast message on a fixed interval. The format of the message is a simple bitfield representing an integer counter that increments by 1 each transmission. Each recipient measures the time between any two messages and divides that duration by the difference in the message counter to derive the sender's transmission period. For every such period that passes, the recipient records a single bit regarding whether that sender's transmission was received (one) or not received (zero). The history of these bits forms the basis for the measurement "peer broadcast reliability".

Using an ordered series of bits to represent the history of receipts and failures, we can estimate the likelihood of receiving any one broadcast from a given peer by counting the ones and dividing by the number of bits in the series. Since the information becomes decreasingly valuable over time, it is desirable to remove the oldest data from time to time. Using a simple static series length tends to suffer from one of two problems: either the series is too short which makes the algorithm respond too quickly to momentary events, or else the series is too long which makes the algorithm respond too slowly to avoid the initial congestion.

To avoid these problems, we split the series into halves. We create a null hypothesis that the difference between the proportion of ones in each of the two subseries is not statistically significant. After we record each element into the series, we evaluate the null hypothesis. If the null hypothesis is demonstrated to be false, then we discard the oldest half of the series. In this fashion, the history grows during periods of relatively stable communication and provides a stable estimate of the peer broadcast reliability. When bursts of congestion occur, the probability of broadcast reception decreases rapidly and the newer half of the history becomes significantly worse than the oldest half. In this situation, the estimate of peer broadcast reliability becomes relatively volatile in order to quickly respond to the changing state of the medium.

Predicting Unicast Transmission Latency

In order to extend a relatively accurate estimate of peer broadcast reliability into a prediction of unicast transmission latency, it may be necessary to extend the justification for broadcast loss into the algorithm for unicast retransmission. Pleasantly, modern back-off algorithms use simple integer coefficients that double with each failed transmission. Thus the unicast latency can be seen as the summation of a series of fractional transmission delays, each defined as the probability of failed transmission attempt multiplied by the cost of that transmission attempt. For transmission schemes using a $2^n$ exponential back-off algorithm, the predicted latency is proportional to $2^{(r/p)}$ where p is the peer broadcast reliability and r is the retry delay.

Semantic Concepts Involved
  transmission latency
  message delay
  predictive algorithm
  CSMA Media
  media collision
  retransmission strategy
  backoff algorithm
  exponential backoff
  network congestion
  congestion point FIG. 1 is a flow diagram illustrating a routine for providing congestion management and latency prediction in CSMA media. At block 102, the routine begins. At block 104, the routine measures and logs a series of received and dropped periodic messages exchanged between two networked devices. At block 106, the routine divides the log into a first half containing recent activity and a second half containing older activity. At block 108, the routine compares the integrity (and perhaps other properties) of the two halves. If the integrity of the older half is at least as good as the integrity of the first half, the routine continues at block 112. Otherwise, the routine continues at block 114. At block 112, the routine logs both halves. At block 114, the routine logs the half containing recent activity. At block 116, the routine returns.

The described technology provides at least a method for predicting latency of links in broadcast networks and a method for managing congestion in broadcast networks.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A method that determines data-transmission congestion between a first network node and a second network node, the method comprising:
  receiving, at the second network node, a series of periodic broadcast messages communicated from the first network node to the second network node,
    wherein each one of the periodic broadcast messages are broadcast at a fixed interval,
    wherein each one of the periodic broadcast messages comprises a bitfield that is an integer, and
    wherein the integer is incremented by a value of one for each successive broadcast of each one of the periodic broadcast messages;
  measuring, at the second network node, a time difference between a first one of the received periodic broadcast messages and a second one of the received periodic broadcast messages;
  determining a transmission period, wherein the transmission period is the measured time difference divided by a difference between an integer of the first one of the received periodic broadcast messages and an integer of the second one of the received periodic broadcast messages;
  generating, in response to receiving each new periodic broadcast message, a log of data comprising a total number of bits corresponding to a predefined number of the series of periodic broadcast messages,
    wherein the log of data is an ordered series of bits ordered from a current bit associated with a current periodic broadcast message to an oldest bit associated with an oldest periodic broadcast message that corresponds to the predefined number of the series of periodic broadcast messages,
    wherein a new bit associated with a newly received periodic broadcast message is added as the current bit into the log of data,
    wherein the new bit is a first binary number when the transmission period associated with the newly received periodic broadcast message indicates that the newly received periodic broadcast message was received, wherein the new bit is a second binary number when the transmission period associated with the newly received periodic broadcast message indicates that the newly received periodic broadcast message was dropped, and wherein the oldest bit associated with the oldest periodic broadcast message is removed from the log of data when the new bit is added into the log of data.

2. The method of claim 1, wherein the first binary number is a binary "1" to indicate that the associated periodic broadcast message was received, and wherein the second binary number is a binary "0" to indicate that the associated periodic broadcast message was dropped.

3. The method of claim 1, further comprising:

dividing, in response to receiving a new periodic broadcast message, the log of data into a first log portion containing a first number of bits associated with a first number of periodic broadcast messages received during a first time period and a second log portion containing a second number of bits associated with a second number of periodic broadcast messages received during a second time period, wherein the second time period is earlier than the first time period, and wherein the first number of bits are associated with the first number of periodic broadcast messages, and wherein the second number of bits are associated with the second number of periodic broadcast messages, where the sum of the first number of bits and the second number of bits equals the total number of bits corresponding to the predefined number of the series of periodic broadcast messages represented in the log of data;

determining a first number corresponding to a number of the bits in the first log portion, wherein the number of bits in the first log portion is one of the number of bits having the first binary number or the number of bits having the second binary number;

determining a second number corresponding to a number of the bits in the second log portion, wherein the number of bits in the second log portion is the number of bits having the first binary number when the first number was based on the number of bits having the first binary number, or wherein the number of bits in the second log portion is the number of bits having the second binary number when the first number was based on the number of bits having the second binary number;

comparing the first number and the second number;

if the first number is at least equal to the second number by a predetermined criterion, continuing to generate the log of data using the total number of bits as a next periodic broadcast message is received; and if the first number is less than the second number by the predetermined criterion, discarding the second log portion and continuing to generate the log of data using a new number of bits as the next periodic broadcast message is received, wherein the new number of bits corresponds to the first number of bits in the first log portion.

4. The method of claim 3, further comprising:

comparing the first number with the second number, wherein the second log portion is discarded only when a difference between the first number and the second number is not statistically significant.

5. The method of claim 3, wherein the first number equals the number of the bits in the first log portion that are the first binary number, and wherein the second number equals the number of the bits in the second log portion that are the first binary number.

6. The method of claim 3, wherein the first number equals the number of the bits in the first log portion that are the second binary number, and wherein the second number equals the number of the bits in the second log portion that are the second binary number.

7. The method of claim 3, wherein the first number is a first ratio, wherein the second number is a second ratio, wherein the first ratio is a ratio of a sum of the first binary numbers in the first log portion to a total number of bits in the first log portion, and wherein the second ratio is a ratio of a sum of the first binary numbers in the second log portion to a total number of bits in the second log portion.

8. The method of claim 7, further comprising:

comparing the first ratio with the second ratio, wherein the second log portion is discarded only when a difference between the first ratio and the second ratio is not statistically significant.

9. A method to determine data-transmission congestion between a first network node and a second network node of a network, wherein each one of the periodic broadcast messages are broadcast at a fixed interval, wherein each one of the periodic broadcast messages comprises a bitfield that is an integer, wherein the integer is incremented by a value of one for each successive broadcast of each one of the periodic broadcast messages, and wherein each one of the periodic broadcast messages communicated from the first network node and that are received by the second network node are associated with a first bit, and wherein other periodic broadcast messages communicated from the first network node and that are dropped are associated with a second bit, the method comprising:

measuring, at the second node, a time difference between a first one of the received periodic broadcast messages and a second one of the received periodic broadcast messages;

determining a transmission period, wherein the transmission period is the measured time difference divided by a difference between an integer of the first one of the received periodic broadcast messages and an integer of the second one of the received periodic broadcast messages;

determining that the second one of the received periodic broadcast messages is received when the transmission is less than or equal to a threshold and that the second one of the received periodic broadcast messages is dropped when the transmission is greater than the threshold;

generating, as each new periodic broadcast message is communicated, a log of data comprising a total number of bits, wherein the total number of bits in the log of data corresponds to a predefined total number of monitored periodic broadcast messages, wherein the log of data is an ordered series of the first bits and the second bits ordered from a current bit associated with a current periodic broadcast message to an oldest bit associated with an oldest periodic broadcast message, wherein the bit associated with the newly received periodic broadcast message is added as the current bit into the log of data, and wherein a bit associated with the oldest periodic broadcast message is removed from the log of data;

dividing, as each new periodic broadcast message is communicated, the log of data into a first log portion containing the first bits and the second bits associated with periodic broadcast messages communicated during a first time period and a second log portion containing the first bits and the second bits associated with periodic broadcast messages communicated during a second time period, wherein the second time period is earlier than the first time period;

determining, as each new periodic broadcast message is communicated, a first number corresponding to a number of the first bits in the first log portion, wherein the number of bits in the first log portion is one of the number of bits having the first binary number or the number of bits having the second binary number;

determining, as each new periodic broadcast message is communicated, a second number corresponding to a number of the first bits in the second log portion, wherein the number of bits in the second log portion is the number of bits having the first binary number when the first number was based on the number of bits having the first binary number, or wherein the number of bits in the second log portion is the number of bits having the second binary number when the first number was based on the number of bits having the second binary number;

comparing, as each new periodic broadcast message is communicated, the first number and the second number;

if the first number is at least equal to the second number by a predetermined criterion, continuing to generate the log of data using the total number of bits; and if the first number is less than the second number by the predetermined criterion, discarding the second log portion and continuing to generate the log of data using a new number of bits as a next message is provided, wherein the new number of bits corresponds to the number of the first bits and the second bits in the first log portion.

10. The method of claim 9, wherein further comprising:

monitoring the next periodic broadcast message communicated from the first network node to the second network node, wherein one of the first bit and the second bit is generated based on whether the next periodic broadcast message is received or dropped, and wherein the generated bit is added as the current bit of the log of data.

11. The method of claim 9, wherein the first number is a first ratio, wherein the second number is a second ratio, wherein the first ratio is a ratio of a sum of the first binary numbers in the first log portion to a total number of bits in the first log portion, and wherein the second ratio is a ratio of a sum of the first binary numbers in the second log portion to a total number of bits in the second log portion.

12. The method of claim 10, further comprising:

comparing the first ratio with the second ratio, wherein the second log portion is discarded only when a difference between the first ratio and the second ratio is not statistically significant.

13. The method of claim 9, wherein each first bit is one of a first binary number that indicates that the message was received and each second bit is a second binary number that indicates that the message was dropped.

14. The method of claim 9, wherein the first number equals the number of the first bits in the first log portion, and wherein the second number equals the number of the first bits in the second log portion.

15. The method of claim 9, wherein the first number equals a number of the second bits in the first log portion, and wherein the second number equals a number of the second bits in the second log portion.

* * * * *